United States Patent [19]

Inaba et al.

[11] Patent Number: 4,929,165
[45] Date of Patent: May 29, 1990

[54] DIRECT-PRESSURE MOLD CLAMPING MECHANISM

[76] Inventors: Yoshiharu Inaba, 3509, Ikuta, Tama-ku, Kawasaki-shi; Fumio Mitoguchi, 1-10-9, Hinohon-machi, Hino-shi; Hiromasa Yamashita, 1218-7, Otaueno-machi, Takamatsu-shi, all of Japan

[21] Appl. No.: 333,811

[22] Filed: Apr. 6, 1989

Related U.S. Application Data

[63] Continuation of Ser. No. 167,852, filed as PCT JP87/00427 on June 25, 1987, published as WO88/00120 on Jan 14, 1988, abandoned.

[30] Foreign Application Priority Data

Jun. 30, 1986 [JP] Japan ................. 61-151523

[51] Int. Cl.$^5$ .................. B29C 33/22; B29C 45/66
[52] U.S. Cl. ....................... 425/150; 74/89.15; 74/661; 100/273; 425/419; 425/451.2; 425/451.7; 425/590
[58] Field of Search ........... 425/150, 214, 419, 450.1, 425/451, 451.2, 451.3, 451.7, 451.9, 589, 590, 595; 74/89.15, 661, 665 B, 665 D; 100/269 R, 269 B, 273, 289

[56] References Cited

U.S. PATENT DOCUMENTS

| 55,779 | 6/1866 | Nelson ................. 100/273 |
| 243,879 | 7/1881 | Freeman ............... 100/273 |
| 3,063,708 | 11/1962 | Wollenhaupt ........ 192/150 |
| 3,184,810 | 5/1965 | Hoern .................. 74/661 |
| 3,209,871 | 10/1965 | Moericke ............ 74/665 B |

FOREIGN PATENT DOCUMENTS 51-13495 4/1976 Japan .

OTHER PUBLICATIONS

*American Heritage Dictionary*, Houghton Mifflin Co., Boston, MA, 1982, p. 551.

Primary Examiner—James C. Housel

[57] ABSTRACT

A motor-operated, direct-pressure type mold clamping mechanism capable of high-speed mold closing and opening operations and of producing a required mold clamping force, without the use of a large-sized motor. In the mold opening and closing operations, a ball screw, in engagement with a ball nut which is movable in unison with a moving platen, is rotated at high speed by a coarse-adjustment motor through gears, so that a die is opened and closed at high speed. In the mold clamping operation, the ball screw is driven by a fine-adjustment motor through a clutch and gears which, having a high reduction ratio, serve to enhance the rotatory force and provide greater clamping force.

6 Claims, 3 Drawing Sheets

FIG. I

DIRECT-PRESSURE MOLD CLAMPING MECHANISM

This is a continuation of co-pending application Ser. No. 07/167,852 filed as PCT JP87/00427 on June 25, 1987, published as WO88/00120 on Jan. 14, 1988, now abandoned.

BACKGROUND OF THE INVENTION

1. Field of the Invention

The present invention relates to a motor-operated, direct-pressure type mold clamping mechanism of an injection-molding machine.

2. Description of the Related Art

An injection-molding machine is furnished with a toggle type mold clamping mechanism, in which a drive source and a moving platen are connected by means of a toggle link, or a direct-pressure type mold clamping mechanism, in which the drive source and the moving platen are connected directly. The clamping mechanism serves to open or close and clamp dies that are attached individually to the moving platen and a stationary platen.

In the mold clamping operation, the dies must be clamped with a great force. Thus, a requisite for the drive source of a mold clamping mechanism is the capability of producing a great clamping force. In the process of injection molding, moreover, the time required for the manufacture of each molding, i.e., the cycle time, is expected to be shortened. Another requisite for the drive source, therefore, is to be able to drive the dies at high speed while they are being opened or closed.

The toggle link acts so as to help the dies be opened or closed at high speed, and to facilitate the production of a great clamping force. Thus, the toggle type mold clamping mechanism fulfills both of the aforesaid requirements. The direct-pressure type mold clamping mechanism, on the other hand, has the advantage over the toggle type mold clamping mechanism that it does not require mold thickness adjustment for compensating the change of the die thickness. It is difficult for the direct-pressure type mold clamping mechanism, however, to satisfy both the aforementioned requirements. In the case of a direct-pressure type mold clamping mechanism using a motor as its drive source, for example, both those requirements can be fulfilled only if the motor used has a very large capacity, and therefore, is an expensive one. In consequence, the manufacturing cost of the injection-molding machine increases.

Also, a great clamping force can be obtained with use of a general-purpose motor if its output is enhanced by means of a reduction mechanism. In this case, however, the dies are moved by means of a speed reducer, so that the speed of mold closing and opening operations is reduced. Thus, the cycle time is lengthened, thereby lowering the production efficiency of the injection-molding machine.

SUMMARY OF THE INVENTION

Accordingly, the object of the present invention is to provide a motor-operated, direct-pressure type mold clamping mechanism, capable of high-speed mold closing and opening operations and of producing a required mold clamping force, without the use of any special large-capacity motor.

In order to achieve the above object, a direct-pressure type mold clamping mechanism according to the present invention comprises conversion means including a rotating member and a rectilinear motion member movable in one with a moving platen, the conversion means serving to convert a rotary motion of the rotating member into a rectilinear motion of the rectilinear motion member; a coarse-adjustment motor for driving the rotating member of the conversion means; transmission means for transmitting the rotation of the coarse-adjustment motor to the rotating member, thereby rotating the rotating member at high speed; a fine-adjustment motor for driving the rotating member of the conversion means; and a speed reducer for recuding and enhancing the rotation speed and the rotatory force of the fine-adjustment motor, respectively, and transmitting the rotatory force of the motor, thus enhanced, to the rotating member.

According to the present invention, as described above, the moving platen is driven by means of the coarse-adjustment motor with the aid of the transmission means in a mold closing or opening step, which, although never necessitating production of a particularly great driving force, requires the moving platen to move quickly. In a mold clamping step which, although requiring only low speed and small displacement, demands production of a great clamping force, mold clamping operation is performed with use of the output of the fine-adjustment motor enhanced by means of the speed reducer. Thus, the mold clamping can be effected without using a large-capacity motor, and the mold closing and opening operations can be accomplished in a short time. Accordingly, an economical injection-molding machine with a shorter required cycle time can be obtained.

Moreover, the maximum output torque of the coarse-adjustment motor used need not be great. In protecting dies by limiting the torque of the motor output, therefore, a small optimum die protection force can be obtained. These, together with other objects and advantages, which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
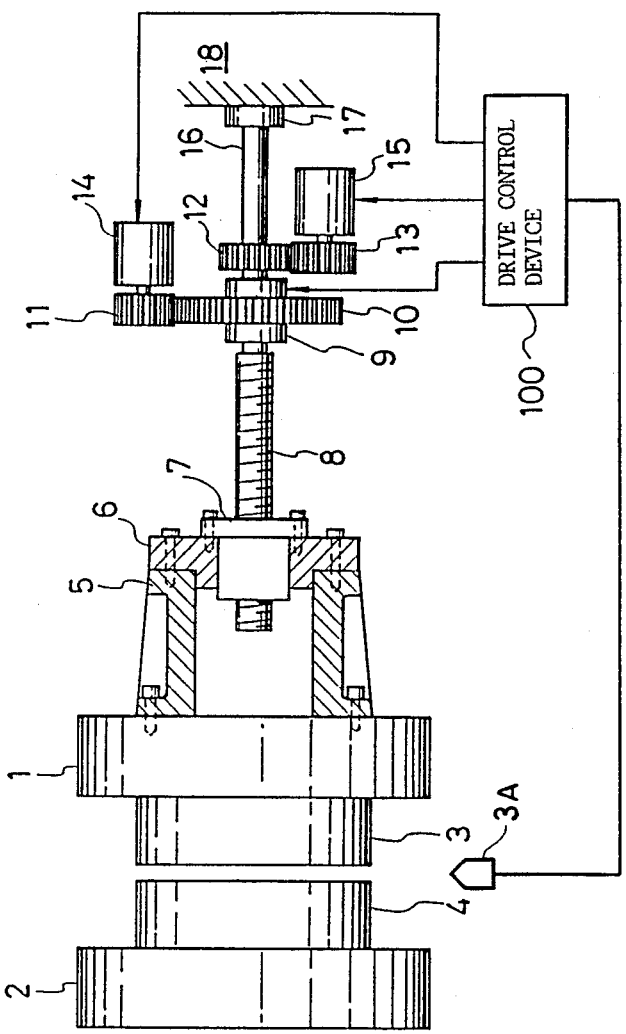
FIG. 1 is a schematic view showing the principal part of a direct-pressure type mold clamping apparatus according to a first embodiment of the present invention.

FIG. 1 shows a direct-pressure type mold clamping mechanism according to a first embodiment of the present invention. In FIG. 1, numerals 1 and 2 denote a moving platen and a stationary platen, respectively. These platens 1 and 2 are fitted with dies 3 and 4, respectively. The stationary platen 2 is fixed to a base 18 of an injection-molding machine, and can slide from side to side, as in FIG. 1, along tie bars (not shown) extending between a rer platen (not shown), which is fixed to the base 18 of the injection-molding machine, and the stationary platen 2. Numeral 5 denotes a nut fixing base which is fixed to the moving platen 1 by means of bolts or the like. A nut mounting plate 6 is fixed to one end of the nut fixing base 5 by means of bolts or the like. Further, a ball nut 7 is fixed to the nut mounting plate 6 by means of bolts or the like. These elements 1 and 5 to 7 constitute an integral structure.

A ball screw 8, which mates with ball nut 7, is mounted so that its axis is substantially in alignment with the center of the moving platen 1. Namely, the ball scrw 8 is positioned so that the dies 3 and 4 can be clamped evenly when the moving platen 1 is moved, through the medium of the ball nut 7, the nut mounting plate 6, and the nut fixing base 5, by rotating the ball screw 8.

A ball screw shaft 16, which is integral with the ball screw 8, has one end rotatably supported by the base 18 (or a rear platen fixed thereto) of the injection-molding machine with the aid of a thrust bearing 17. A spur gear 12 is fixed to the ball screw shaft 16, and a spur gear 13 is in mesh with the gear 12. The gear 13 is fixed to the motor shaft of a coarse-adjustment motor 15. As shown in FIG. 1, the motor shaft extends in parallel with the ball screw. In the present embodiment, the gears 12 and 13 constitute a transmission mechanism for coarse adjustment, which is used to transmit the rotation of the coarse-adjustment motor 15 to the ball screw 8. The rotational ratio between the gears 12 and 13, according to the present embodiment, is 1:1. As the coarse-adjustment motor 15 rotates, therefore, the ball screw 8 rotates at high speed.

An electromagnetic clutch 9 is mounted on the ball screw shaft 16 so as to be interposed between the shaft 16 and the gear 10. Thus, the ball screw shaft 16 and the spur gear 10 are releasably coupled by means of the clutch 9. The gear 10 is in mesh with a spur gear 11, which is fixed to the motor shaft of a motor 14 for fine adjustment. As shown in FIG. 1, the motor shaft extends in parallel with the ball screw. The gears 10 and 11 constitute a reduction mechanism. The rotation speed and the torque of the fine-adjustment motor 14 are reduced and enhanced, respectively, and are transmitted to the ball screw 8, by means of the gears 11 and 12.

The fine- and coarse-adjustment motors 14 and 15 are fixed on the base 18 of the injection-molding machine. The ball screw shaft 16 is supported in a suitable position by means of a radial bearing (not shown). For accuracy and ease of positioning, the fine- and coarse-adjustment motors 14 and 15 are each composed of a servomotor.

In FIG. 1, numeral 100 denotes a device for controlling the drive of the clutch and the motors 14 and 15. A description of the device 100 is omitted herein, since this device can be constructed by a conventional technique.

The operation of the mold clamping mechanism according to the present embodiment will now be described.

First, in closing the dies, the clutch 9 is disengaged to disconnect the ball screw shaft 16 and the gear 10. Thereafter, the coarse-adjustment motor 15 is driven to rotate the ball screw shaft 16 and the ball screw 8 integral therewith at high speed through the medium of the gears 13 and 12. As the ball screw 8 rotates, the ball nut 7, which is in engagement with the ball screw 8, moves along the ball screw 8 toward the die 4, thereby advancing the nut mounting plate 6, the nut fixing base 5, and the moving platen 1, the plate 6 being movable in one with the ball nut 7. As a result, the die 3 moves toward the die 4 at high speed. When the die 3 (moving platen 1) reaches a die protection start position, thereafter, the rotating speed of the coarse-adjustment motor 15 is reduced so that the die 3 is driven at a die protection speed. When the die 3 reaches the position where the dies 3 and 4 are closed, the clutch 9 is engaged to connect the gear 10 and the ball screw shaft 16. Then, the fine-adjustment motor 14 is driven, while the coarse-adjustment motor 15 is deenergized and allowed to race.

Thereupon, the ball screw 8 is driven at fine speed by the drive motor 14 through the medium of the reduction mechanism, composed of the gears 11 and 10, the clutch 9, and the ball screw shaft 16. Thus, the dies 3 and 4, already in contact with each other, are clamped by means of the ball nut 7, nut mounting plate 6, nut fixing base 5, and moving platen 1. In doing this, the moving platen 1 is driven by means of the output of the fine-adjustment motor 14, which is enhanced by the reduction mechanism including the gears 11 and 10, so that a great clamping force is produced.

The control device 100 drives the fine-adjustment motor 14 up to a rotational position where a set clamping force is produced. Then, the device 100 operates so as to keep the fine-adjustment motor 14 in this rotational position. While the fine-adjustment motor 14 is being driven in this manner, the coarse-adjustment motor 15 races through the medium of the ball screw shaft 16 and the gears 12 and 13. The displacement of the die 3 (moving platen 1) is detected by means of a position detector 3A which is attached to the coarse-adjustment motor 15.

Thereafter, an injection process and a hold process are executed, whereupon a mold opening process is started. In opening the dies, the drive of the fine-adjustment motor 14 is stopped, and the clutch 9 is disengaged to disconnect the ball screw shaft 16 and the gear 10. Subsequently, the coarse-adjustment motor 15 is rotated at a mold release speed in the direction opposite to the mold closing direction. When the die 3 then reaches an acceleration start position, the dies are opened at high speed. When the die 3 then reaches a deceleration position, the motor 15 is driven at a low mold opening speed. When the die 3 reaches a mold opening end position, the drive of the coarse-adjustment motor 15 is stopped.

If an incremental position detector is attached to the fine-adjustment motor 14, the fine-adjustment motor 14 need not be driven reversely to a mold clamping start position, that is, for a rotational amount for mold clamping, at the time of mold opening. If an absolute position detector is attached to the motor 14, however, the motor 14 must be returned to the mold clamping start position in advance. If the fine- and coarse-adjustment motors 14 and 15 are composed of any other motors than servomotors, moreover, the motors 14 and 15 must be controlled by detecting the arrival of the moving platen 1 at various positions, such as a die touch position and the die protection start position, by means of a sensor. Furthermore, braking means may be used to lock the rotation of the ball screw 8. When the set clamping force is produced, in this case, the braking means is worked to lock the ball screw 8, while the drive of the fine-adjustment motor 14 is stopped.

Figure 2:
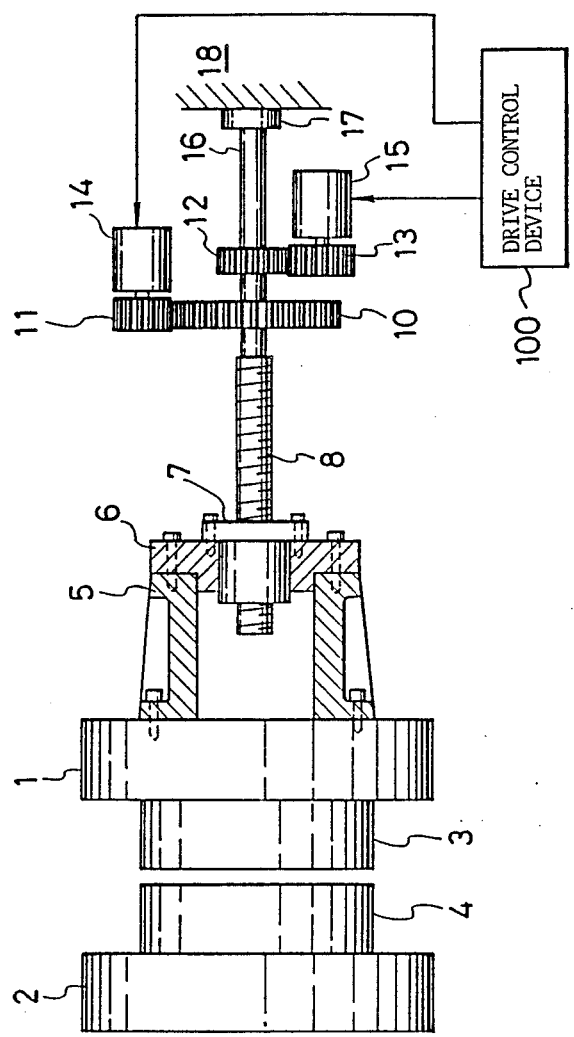
FIG. 2 is a schematic view showing an apparatus according to a second embodiment of the present invention.

FIG. 2 shows a mold clamping mechanism according to a second embodiment of the present invention. This mold clamping mechanism differs from the apparatus of the first embodiment in that it is not provided with the clutch 9. More specifically, in this second embodiment, the gear 10 is fixed directly to the ball screw shaft 16. As regards the other elements, this apparatus is arranged in the same manner as the first embodiment, so that those elements common to the two embodiments are designated by like reference numerals, and their description is omitted herein. The operation of this apparatus will now be described.

First, in starting the mold closing operation, the fine-adjustment motor 14 is deenergized, while the coarse-adjustment motor 15 is driven, thereby advancing (in the mold closing direction) the moving platen 1 and the die 3 mounted thereon at high speed. After reaching the die protection start position, the die 3 is further advanced at the die protection speed. When the dies 3 and 4 touch each other, the fine-adjustment motor 14 is driven, and the coarse-adjustment motor 15 is deenergized. Thereupon, the rotation speed and the output of the fine-adjustment motor 14 are reduced and enhanced, respectively, by the speed reducer composed of the gears 11 and 10, so that the die 3 is advanced at a fine speed and with a great force. As a result, a great clamping force is produced. When the die 3 moves to the position where the set clamping force is obtained, the control device 100 drives the fine-adjustment motor 14 so that the die is held in that position. Also in this second embodiment, a braking system for locking the rotation of the ball screw 8 may be provided so that the die 3 is held in the set clamping force producing position.

During the mold closing operation described above, either the coarse-adjustment motor 15 or the fine-adjustment motor 14 is driven, while the other motor races. Thus, the current position of the die 3 can always be detected by means of the position detector attached to the fine- or course-adjustment motor 14 or 15.

In the mold opening operation, the fine-adjustment motor 14 is deenergized, while the coarse-adjustment motor 15 is driven at the mold release speed to retreat or withdraw the die 3. When the die 3 reaches the acceleration start position, the mold opening is performed at high speed. When the die 3 reaches the deceleration start position, the motor 15 is rotated at the low mold opening speed. When the mold opening end position is reached, the drive of the coarse-adjustment motor 15 is stopped. Thus, the mold closing, clamping, and opening operations for one cycle time are finished.

In the mold clamping operation, according to this second embodiment, the fine- and coarse-adjustment motors 14 and 15 are driven and deenergized, respectively. Alternatively, however, the coarse-adjustment motor 15 may be driven at the same time. If the reduction ratios between the gears 11 and 10 of the reduction mechanism and between the gears 12 and 13 are set, for example, to 1:24 and 1:1, respectively, the fine- and coarse-adjustment motors 14 and 15 are driven so that the rotational ratio between them is 24:1. For example, the control device 100 is composed of a numerical control unit, which performs pulse distribution (linear interpolation) to a servo-circuit, used to drive the fine- and coarse-adjustment motors 14 and 15, in the ratio 24:1.

As in the aforementioned modification of the first embodiment, the fine- and coarse-adjustment motors 14 and 15 may be composed of general-purpose motors.

Figure 3:
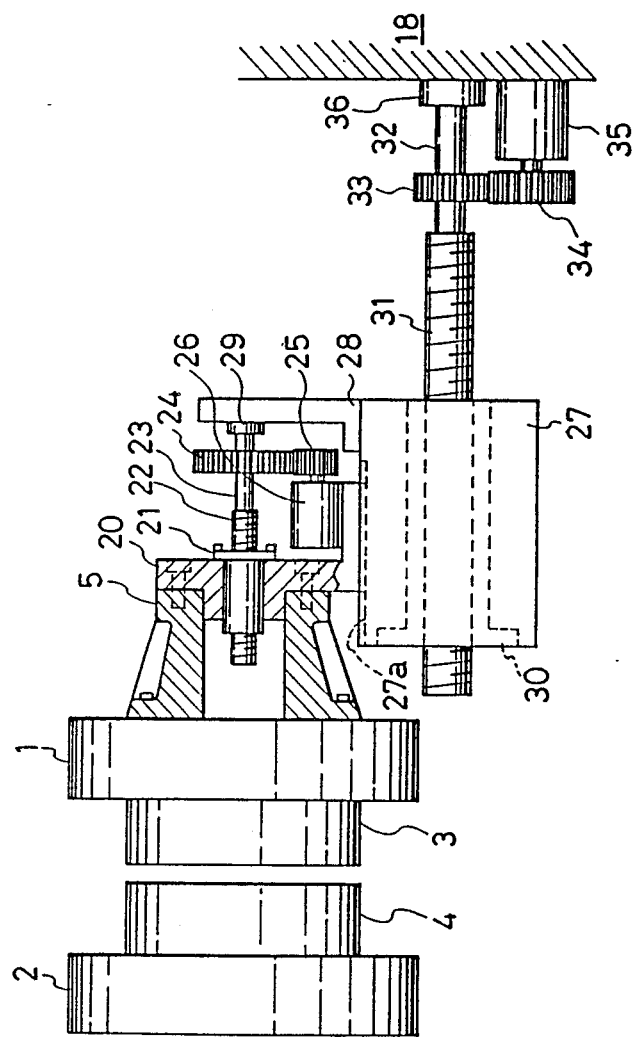
FIG. 3 is a schematic view showing an apparatus according to a third embodiment of the present invention.

FIG. 3 shows a mold clamping apparatus according to a third embodiment of the present invention. In the description to follow, like reference numerals are used to designate the same members as used in the first embodiment.

More specifically, numeral 1 denotes a moving platen; 2, a stationary platen; 3 and 4, dies; and 5, a nut fixing base fixed to the moving platen 1.

This embodiment differs from the first embodiment, which uses the ball nut 7 and the ball screw 8 forming a pair, mainly in that two pairs of ball nuts and ball screws for coarse and fine adjustment are used instead. A nut mounting plate 20 is fixed to the nut fixing base 5 by means of bolts or the like, and a fine-adjustment ball screw 22 is in engagement with a fine-adjustment ball nut 21 which is fixed to the nut mounting plate 20. The nut mounting plate 20 can slide along a guide surface 27a of a coarse-adjustment feed table 27, in a direction (from side to side as in FIG. 3) along which the dies 3 and 4 are opened or closed. Further, a fine-adjustment motor 26, which is composed of a servomotor, is mounted on the nut mounting plate 20, and a gear 25 is fixed to the output shaft of the fine-adjustment motor 26. The gear 25 is in mesh with a gear 24 which is fixed to a shaft 23 of the fine-adjustment ball screw 22. The gears 25 and 24 constitute a speed reducer which serves to reduce and enhance the rotation speed and the output torque, respectively, of the fine-adjustment motor 26, and transmit them to the ball screw 22. The reduction ratio between the gears 25 and 24 is set to a value great enough to produce the required clamping force.

One end of the fine-adjustment ball screw shaft 23 is fixed, by means of a thrust bearing 29, to a bearing plate 28 which is fixed to the coarse-adjustment feed table 27. A ball nut 30 for coarse-adjustment is fixed to the feed table 27, and a ball screw 31 for coarse-adjustment is in engagement with the ball nut 30. The coarse-adjustment ball nut 30 and the coarse-adjustment feed table 27 are arranged to move in the opening or closing direction for the dies 3 and 4 as the coarse-adjustment ball screw 31 rotates. The coarse-adjustment feed table 27 is guided by a guide rod (not shown) or the like so as to be movable in the opening or closing direction for the dies 3 and 4. A gear 33 is fixed to a shaft 32 of the coarse-adjustment ball screw 31. The gear 33 is in mesh with a ger 34 fixed to the output shaft of a coarse-adjustment motor 35 which is composed of a servomotor. Further, locking means 36, such as a brake or a dog clutch, is attached to one end of the coarse-adjustment ball screw shaft 32. The locking means and the coarse-adjustment motor 35 are fixed to the base 18 of the injection-molding machine or a rear platen which is fixed to the base 18.

The operation of the mold clamping apparatus according to this third embodiment will now be described.

First, in the mold closing operation, the rotation of the fine-adjustment motor 26 is stopped, while the coarse-adjustment motor 35 is driven. When the coarse-adjustment ball screw 31 rotates at high speed through the medium of the gears 34 and 33 and the ball screw shaft 32, accompanying the motor rotation, the coarse-adjustment ball nut 30 advances, and the coarse-adjustment feed table 27 and the bearing plate 28, which are integral with the coarse-adjustment ball nut 30, also advance. As a result, the die 3 moves in the mold closing direction (forward) at high speed, through the medium of the thrust bearing 29, fine-adjustment ball screw 22, fine-adjustment ball nut 21, nut mounting plate 20, nut fixing base 5, and the moving platen 1. When the die 3 reaches the die protection start position, the rotating speed of the coarse-adjustment motor 35 is lowered so that the die 3 is advanced at the die protection speed. When the dies 3 and 4 touch each other, the drive of the coarse-adjustment motor 35 is stopped, and the locking means 36, e.g., a braking system, is worked to lock the rotation of the coarse-adjustment ball screw 31. Then, the fine-adjustment motor 26 is driven. As the fine-adjustment motor 26 rotates, the fine-adjustment ball screw 22 rotates at a speed reduced and with torque enhanced in accordance with the reduction ratio of the reduction mechanism which is composed of the gears 25 and 24. Accordingly, the ball nut 21 in mesh with the ball screw 22 advances, and the die 3 advances at a fine speed and with a great force, through the medium of the nut mounting plate 20, the nut fixing base 5, and the moving platen 1, which are movable in one with the nut. Thus, the mold clamping is performed with a great force.

Subsequently, in the mold opening operation, the braking system as the locking means 36 is released, and the coarse-adjustment motor 35 is then rotated reversely (in the mold opening direction) at the mold release speed. As the motor rotates, the coarse-adjustment ball screw 31 rotates, and the coarse-adjustment feed table 27, nut mounting plate 20, nut fixing base 5, moving platen 1, and die 3, which are movable in one with the coarse-adjustment ball nut 30 in engagement with the ball screw, move in the mold opening direction. When the die 3 reaches the acceleration start position, the coarse-adjustment motor 35 is accelerated to high-speed mold opening. When the die 3 reaches the deceleration start position, the motor 35 is decelerated. When the mold opening end position is reached, the drive of the coarse-adjustment motor 35 is stopped, whereupon the mold opening operation is finished.

During the mold opening operation of the coarse-adjustment motor 35, the fine-adjustment motor 26 is rotated reversely (in the mold opening direction), and the die 3 is retreated by a margin corresponding to the advance for the mold clamping. The displacement of the die 3 for the mold clamping is much smaller than that for the mold closing or opening by the coarse-adjustment motor 35. As compared with the displacement of about 0.5 mm for the die displacement for the mold clamping, for example, the displacement for the mold closing or opening ranges from 400 mm to 500 mm or thereabout. Thus, during the mold opening operation, the speed of retreat of the die 3, accompanying the drive of the fine-adjustment motor 26, is too low to exert any special influence on the mold release speed and the like.

If a dog clutch is used for the locking means 36, its spring is adjusted in advance so that the coarse-adjustment ball screw shaft 32 can move back to the right of FIG. 3 when the shaft 32 is pushed to the right, through the medium of the coarse-adjustment feed table 27, the coarse-adjustment ball screw 31, etc., by a reaction force produced at the time of mold clamping. In the mold clamping operation, the fine-adjustment motor 26 must be further rotated in the mold closing direction by a margin corresponding to the retreat of the coarse-adjustment ball screw shaft 32, thereby compensating the extent of retreat of the coarse-adjustment ball screw shaft 32. In the process of mold opening, moveover, the fine-adjustment motor 26 is additionally rotated to the same extent in the mold opening direction.

As in the modifications of the first and second embodiments, furthermore, the fine- and coarse-adjustment motors 26 and 35 may be composed of general-purpose motors. In this case, the motors 26 ad 35 must be controlling by detecting the position of the coarse-adjustment feed table 27, the position of the nut mounting plate 20 relative to the coarse-adjustment feed table 27 (and the clamping force), etc., by means of a sensor.

According to the present invention, as described above in connection with the first to third embodiments, the fine-adjustment motor is used to apply a clamping force, while the coarse-adjustment motor is used to effect the mold opening operation. Thus, the two motors have their respective allotted functions, so that an economical mold clamping mechanism can be obtained without using any large-capacity motors for the individual motors.

Since the functions are thus allotted, and as the output torque of the motors used is not particularly high, moreover, an optimum die protection torque can be obtained even though the output torque of the coarse-adjustment motor 15 or 35 is limited for die protection. In this connection, if only one motor is used for the mold closing, clamping, and opening operations of a direct-pressure mold clamping mechanism, the maximum output torque of the motor must inevitably be adjusted to the clamping force. If a motor is used which can produce the maximum output torque corresponding to the clamping force of 100 tons, for example, the output torque obtained at the time of die protection takes a value equivalent to a pressure of 1 ton at the minimum, since the torque limit resolving power is 1/100 or thereabout. Thus, in this case, the die protection is difficult. However, if the coarse-adjustment motor is used exclusively for the mold closing and opening operations, as in the case of the present invention, the mold opening can be effected with use of a motor which can produce an output torque equivalent to a pressure of only about 2 tons to 3 tons. Thus, an optimum die protection pressure of about 20 kg to 30 kg can be obtained.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

We claim:

1. A direct-pressure mold clamping mechanism for use in an injection-molding machine having a moving platen, said mechanism comprising:
   a single ball nut connected for movement in unison with said moving platen;
   a rotatable single ball screw threadedly engaged with said single ball nut whereby rotation of said ball screw effects rectilinear motion of said ball nut;
   a ball screw shaft integrally connected to said ball screw;
   a coarse-adjustment servomotor, having a motor shaft extending in parallel with said ball screw, for driving said single ball screw;
   transmission means, having a first spur gear fixed on said motor shaft of said coarse-adjustment servomotor and a second spur gear meshing directly with said first gear and fixed on said ball screw shaft, for transmitting rotation of said coarse-adjustment servomotor to said single ball screw, thereby rotating said single ball screw at high speed;

a fine-adjustment servomotor, having a motor shaft extending in parallel with said ball screw, for driving said single ball screw, said fine-adjustment servomotor having a rotation speed and a rotary force when operating;

a speed reducer, having a first spur gear fixed on said motor shaft of said fine-adjustment servomotor and a second spur gear meshing directly with said first gear of said speed reducer, for reducing the rotation speed and enhancing the rotary force of said fine-adjustment motor, and for transmitting the thus enhanced rotary force of said fine-adjustment servomotor to said single ball screw;

a clutch fixed on said ball screw shaft for releasably coupling said ball screw shaft to said second spur gear of said speed reducer;

a detector operatively coupled to at least one of said fine- and coarse-adjustment servomotors, for detecting a moving position of said moving platen; and control means connected in control relation with said coarse- and fine-adjustment servomotors, said detector, and said clutch, for controlling said servomotors and said clutch in accordance with a detected moving position of said moving platen.

2. A direct-pressure mold clamping mechanism according to claim 1, further comprising locking means for locking said single ball screw.

3. A direct-pressure mold clamping mechanism for use in an injection-molding machine having a moving platen, said mechanism comprising:

a single ball nut connected for movement in unison with said moving platen;

a rotatable single ball screw threadedly engaged with said single ball nut whereby rotation of said ball screw effects rectilinear motion of said ball nut;

a ball screw shaft integrally connected to said ball screw;

a coarse-adjustment servomotor, having a motor shaft extending in parallel with said ball screw shaft, for driving said single ball screw;

transmission means, having a first spur gear fixed on said motor shaft of said coarse-adjustment servomotor and a second spur gear meshing directly with said frst gear and fixed on said ball screw shaft, for transmitting rotation of said coarse-adjustment servomotor to said single ball screw, thereby rotating said single ball screw at high speed;

a fine-adjustment servomotor, having a motor shaft extending in parallel with said ball screw shaft, for driving said single ball screw, said fine-adjustment servomotor having a rotation speed and a rotary force when operating;

a speed reducer, having a first spur gear fixed on said motor shaft of said fine-adjustment servomotor and a second spur gear fixed on said ball screw shaft and meshing directly with said first gear of said speed reducer, for reducing the rotation speed and enhancing the rotary force of said fine-adjustment motor, and for transmitting the thus enhanced rotary force of said fine-adjustment servomotor to said single ball screw;

a detector operatively coupled to at least one of said fine- and coarse-adjustment servomotors, for detecting a moving position of said moving platen; and control means connected in control relation with said coarse- and fine-adjustment servomotors and said detector, for controlling said servomotors in accordance with a detected moving position of said moving platen.

4. A direct-pressure mold clamping mechanism according to claim 3 further comprising locking means for locking said single ball screw.

5. A direct-pressure mold clamping mechanism for use in an injection-molding machine having a moving platen, said mechanism comprising:

a ball screw/nut mechanism for fine-adjustment having a rotatable fine-adjustment ball screw which has a shaft, and a fine-adjustment nut threadably engaged with said fine-adjustment ball screw whereby rotation of said fine-adjustment ball screw effects rectilinear motion of said fine-adjustment nut, said fine-adjustment nut being connected for movement in unison with said moving platen;

a ball screw/nut mechanism for coarse-adjustment having a rotatable coarse-adjustment ball screw which has a shaft, and a coarse-adjustment nut threadably engaged with said coarse-adjustment ball screw whereby rotation of said coarse-adjustment ball screw effects rectilinear motion of said coarse-adjustment nut, said coarse-adjustment nut being connected for movement in unison with said shaft of said fine-adjustment ball screw and disposed to be axially movable relative to said fine-adjustment ball nut;

a fine-adjustment servomotor connected for movement in unison with said fine-adjustment ball nut, for driving said fine-adjustment ball screw, said fine-adjustment servomotor having a shaft and having a rotation speed and rotary force when operating;

a coarse-adjustment servomotor, having a shaft, for driving said coarse-adjustment ball screw;

a speed reducer, having a first gear fixed on said shaft of said fine-adjustment servomotor and a second gear meshing with said first gear, for reducing the rotation speed and enhancing the rotary force of said fine-adjustment motor, and for transmitting the thus enhanced rotary force of said fine-adjustment servomotor to said fine-adjustment ball screw;

transmission means, having a first gear fixed on said shaft of said coarse-adjustment servomotor and a second gear meshing with said transmission means first gear and fixed on said shaft of said coarse-adjustment ball screw, for transmitting rotation of said coarse-adjustment servomotor to said coarse-adjustment ball screw, thereby rotating said coarse-adjustment ball screw at high speed;

a detector operatively coupled to at least one of said fine- and coarse-adjustment servomotors, for detecting a moving position of said moving platen; and control means connected in control relation with said coarse- and fine-adjustment servomotors and said detector, for controlling said servomotors in accordance with a detected moving position of said moving platen.

6. A direct-pressure mold clamping mechanism according to claim 5 further comprising locking means for locking said single ball screw.

* * * * *

UNITED STATES PATENT AND TRADEMARK OFFICE
CERTIFICATE OF CORRECTION

PATENT NO. : 4,929,165
DATED : May 29, 1990
INVENTOR(S) : Yoshiharu Inaba, Fumio Mitoguchi, Hiromasa Yamashita It is certified that error appears in the above-identified patent and that said Letters Patent is hereby corrected as shown below:

```
Column 2, line 10, "recuding" should be --reducing--;

line 11, "rotatory" should be --rotary--;

line 13, "rotatory" should be --rotary--;

line 36, begin a new paragraph with "These, together";

line 64, "rer" should be --rear--.

Column 6, line 41, "ger" should be --gear--.
```

Signed and Sealed this

Twentieth Day of August, 1991

*Attest:*

HARRY F. MANBECK, JR.

*Attesting Officer*    *Commissioner of Patents and Trademarks*